United States Patent
Li et al.

(10) Patent No.: US 11,292,545 B2
(45) Date of Patent: Apr. 5, 2022

(54) MULTIMEDIA SYSTEMS FOR SHARED BICYCLES

(71) Applicant: HANGZHOU QINGQI SCIENCE AND TECHNOLOGY CO., LTD., Zhejiang (CN)

(72) Inventors: Gang Li, Hangzhou (CN); Guotai He, Hangzhou (CN); Shenghong Cai, Hangzhou (CN); Zaixing Li, Hangzhou (CN); Sheng Liu, Hangzhou (CN)

(73) Assignee: HANGZHOU QINGQ SCIENCE AND TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/784,474

(22) Filed: Feb. 7, 2020

(65) Prior Publication Data

US 2020/0172188 A1    Jun. 4, 2020

Related U.S. Application Data

(63) Continuation of application No. PCT/CN2018/090048, filed on Jun. 6, 2018.

(30) Foreign Application Priority Data

Aug. 7, 2017  (CN) .......................... 201720982077.2
Feb. 6, 2018  (CN) .......................... 201820211204.3

(51) Int. Cl.
*B62J 50/22*  (2020.01)
*B62J 45/10*  (2020.01)
(Continued)

(52) U.S. Cl.
CPC .............. *B62J 50/22* (2020.02); *B62J 6/165* (2020.02); *B62J 43/30* (2020.02); *B62J 45/10* (2020.02);
(Continued)

(58) Field of Classification Search
CPC ..................................................... B62J 50/22
See application file for complete search history.

(56) References Cited

U.S. PATENT DOCUMENTS

| | | |
|---|---|---|
| 2015/0091698 A1 | 4/2015 | Du |
| 2016/0221627 A1 | 8/2016 | Hines et al. |
| | (Continued) | |

FOREIGN PATENT DOCUMENTS

| | | |
|---|---|---|
| AU | 2017100901 A4 | 8/2017 |
| CN | 201425829 Y | 3/2010 |
| | (Continued) | |

OTHER PUBLICATIONS

The Extended European Search Report in European Application No. 18843710.7 dated Apr. 3, 2020, 9 pages.
International Search Report in PCT/CN2018/090048 dated Sep. 7, 2018, 7 pages.
(Continued)

*Primary Examiner* — Travis R Hunnings
(74) *Attorney, Agent, or Firm* — Metis IP LLC

(57) ABSTRACT

A multimedia system may include a main control unit of a bicycle lock, a display unit, and a cloud server. The display unit may include a plurality of display screens. The main control unit may report an electric quantity of the shared bicycle to the cloud server when the bicycle lock is unlocked. The cloud server may send multimedia information to the main control unit when the shared bicycle is at a high level of electric quantity. The main control unit may refrain from turning on the display unit when the shared bicycle is at a low level of electric quantity. The multimedia system may turn on or off a display screen according to the electric quantity of the shared bicycle, and the display screen may display the multimedia information for advertising. The
(Continued)

multimedia system may further include a navigation module to provide navigation for users and facilitate user travel.

12 Claims, 6 Drawing Sheets

(51) Int. Cl.
  *B62J 50/21* (2020.01)
  *B62J 6/165* (2020.01)
  *G01C 21/36* (2006.01)
  *B62J 43/30* (2020.01)
(52) U.S. Cl.
  CPC ........ *B62J 50/225* (2020.02); *G01C 21/3629* (2013.01)

(56) References Cited

U.S. PATENT DOCUMENTS

| | | | |
|---|---|---|---|
| 2017/0029056 A1* | 2/2017 | Applegate | B62J 6/01 |
| 2017/0364995 A1* | 12/2017 | Yan | B62H 3/00 |
| 2018/0018840 A1 | 1/2018 | Xia et al. | |
| 2018/0370594 A1* | 12/2018 | Foley | B62H 5/00 |
| 2019/0244284 A1* | 8/2019 | Miwa | G07F 15/005 |

FOREIGN PATENT DOCUMENTS

| | | | |
|---|---|---|---|
| CN | 102222410 | A | 10/2011 |
| CN | 102298608 | A | 12/2011 |
| CN | 102298808 | A | 12/2011 |
| CN | 105674978 | A | 6/2016 |
| CN | 106097590 | A | 11/2016 |
| CN | 106871910 | A | 6/2017 |
| CN | 106899658 | A | 6/2017 |
| CN | 106945778 | A | 7/2017 |
| CN | 107202590 | A | 9/2017 |
| EP | 3188141 | A1 | 7/2017 |

OTHER PUBLICATIONS

Written Opinion in PCT/CN2018/090048 dated Sep. 7, 2018, 8 pages.
Communication Pursuant to Article 94(3) EPC in European Application No. 18843710.7 dated Nov. 16, 2021, 9 pages.

* cited by examiner

MULTIMEDIA SYSTEMS FOR SHARED BICYCLES

CROSS-REFERENCE TO RELATED APPLICATIONS

This application is a continuation of International Application No. PCT/CN 2018/090048, filed on Jun. 6, 2018, which claims priority of Chinese Patent Application No. 201820211204.3, filed on Feb. 6, 2018, which claims priority of Chinese Patent Application No. 201720982077.2, filed on Aug. 7, 2017, the contents of each of which are hereby incorporated by reference.

TECHNICAL FIELD

The present disclosure relates to shared bicycles, and in particular, relates to multimedia systems for shared bicycles.

BACKGROUND

A shared bicycle is used in a shared bicycle service provided by cooperations between enterprises and government at campuses, subway stations, bus stations, residential areas, commercial areas, public service areas, etc. The shared bicycle is a new form of sharing economy.

When a user opens an application of a shared bicycle service, a distribution map of available shared bicycles nearby may be presented, and the user may order an available shared bicycle. After the user finds a shared bicycle, the user may unlock the shared bicycle by scanning a quick response (QR) code or inputting a code using a mobile phone. After using the shared bicycle, the user may park the shared bicycle in an area on one of the both sides of a road, and lock the shared bicycle to finish using the shared bicycle.

However, as an emerging platform, there is no multimedia system on the existing shared bicycles. The inherent transmission channels of multimedia information of the shared bicycles cannot be used, which induces a waste of resources. Meanwhile, the shared bicycles may have no enough power to maintain operations of the multimedia systems because of the high power consumption of the multimedia systems. Staffs have to frequently recycle shared bicycles, which greatly increases operating costs. In addition, there are no navigation functions on the existing shared bicycles, users have to use their mobile phones to navigate when riding. It is very dangerous and may lead to traffic accidents.

Therefore, how to use shared bicycle platforms for spreading multimedia information, how to control multimedia systems to use power reasonably, and how to control the multimedia systems to navigate are significant research issues for those skilled in the art.

SUMMARY

The present disclosure provides multimedia systems for shared bicycles to solve technical problems of lack of multimedia players and navigation equipment and to solve the problems of high power consumption of shared bicycles with respect to the above-mentioned shortcomings of the existing technology.

In order to solve the above technical problems, the present disclosure provides a multimedia system for shared bicycles. The multimedia system may include a main control unit of a bicycle lock, a display unit, and a cloud server. The display unit may include a plurality of display screens. The main control unit of the bicycle lock may be configured to report an electric quantity of the shared bicycle to the cloud server when the bicycle lock is unlocked. The cloud server may be configured to send multimedia information to the main control unit of the bicycle lock when the shared bicycle is at a high level of electric quantity. The main control unit of the bicycle lock may be configured to turn on and control at least one display screen of the plurality of display screens to display the multimedia information, and the main control unit of the bicycle lock may be configured to refrain from turning on the display unit when the shared bicycle is at a low level of electric quantity.

In some embodiments, the multimedia system may include a main control unit of a bicycle lock, a display unit, and a cloud server. The display unit may include a plurality of display screens. The cloud server may be configured to send a predetermined time and multimedia information to the main control unit. The main control unit may be configured to turn on and control at least one display screen of the plurality of display screens to display the multimedia information at the predetermined time.

In some embodiments, the multimedia system may further include a navigation unit. The navigation unit may include a switch and a GPS module both disposed on the display unit. The GPS module may be configured to generate a navigation route according to GPS signals when both the at least one display screen and the switch are turned on, and the at least one display screen may be configured to display the navigation route.

In some embodiments, the multimedia system may further include a mobile terminal. The navigation unit may further include a Bluetooth module. The mobile terminal may be wirelessly connected to the Bluetooth module, and the Bluetooth module may be configured to send the navigation route to the mobile terminal.

In some embodiments, the multimedia system may further include a speaker. The speaker may be connected to the GPS module. The GPS module may be configured to send the navigation route to the speaker, and the speaker may be configured to play, according to the navigation route, a voice for navigation.

In some embodiments, the at least one display screen may include a first display screen. The first display screen may be disposed at the front of the shared bicycle.

In some embodiments, the at least one display screen may include a second display screen. The second display screen may be disposed above a rear tire of the shared bicycle.

In some embodiments, the first display screen may be configured to display the multimedia information or the navigation route, and the second display screen may be configured to display the multimedia information.

In some embodiments, the multimedia information may include a picture, a video, a text or a voice.

In some embodiments, the multimedia system may include a main control unit of a bicycle lock, a display unit, and a mobile terminal. The display unit may include a plurality of display screens. The main control unit of the bicycle lock may be configured to turn on at least one display screen of the plurality of display screens when the shared bicycle is at a high level of electric quantity. The mobile terminal may be configured to send multimedia information to the main control unit of the bicycle lock, and the main control unit of the bicycle lock may be configured to control the at least one display screen to play the multimedia information.

The beneficial effects of the present disclosure may include: compared with the prior art, the present disclosure may provide a multimedia system for a shared bicycle, which is equipped with a display screen that can display multimedia information, so as to achieve the purpose of advertising. Meanwhile, the multimedia system may be equipped with a navigation module to provide navigation for users, thereby making it easy for users to travel, and also avoiding dangerous behaviors of a user including holding a navigation device or watching navigation routes when riding a shared bicycle. In addition, the multimedia system may turn on the at least one display screen based on the electric quantity of the shared bicycle, the at least one display screen may be turned off when the shared bicycle is at a low level of electric quantity to prevent from affecting the use of the shared bicycle due to the low level of electric quantity; and the multimedia system may also be equipped with a plurality of navigation prompts to further improve user experiences.

BRIEF DESCRIPTION OF THE DRAWINGS

The present disclosure is further described in terms of exemplary embodiments with reference to the drawings, wherein.

DETAILED DESCRIPTION

The embodiments of the present disclosure may be described in detail with reference to the drawings.

Figure 1:
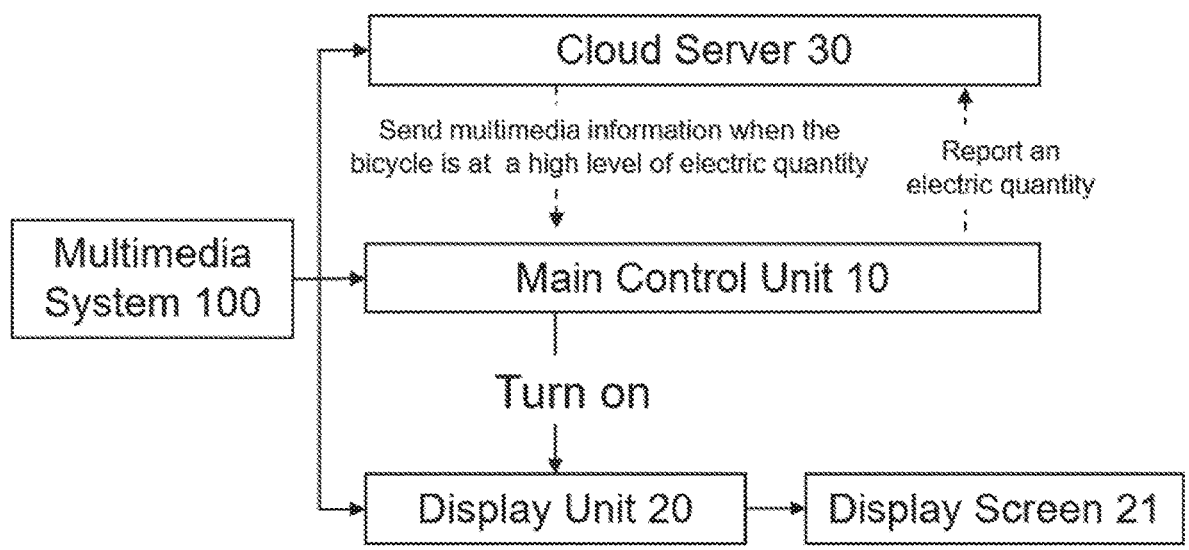
FIG. 1 is a block diagram illustrating an exemplary multimedia system of the present disclosure.

As shown in FIG. 1, the present disclosure provides an exemplary embodiment of a multimedia system 100.

The multimedia system 100 for a shared bicycle may include a main control unit 10 of a bicycle lock, a display unit 20, and a cloud server 30. The display unit 20 may include a plurality of display screens 21.

In some embodiments, the main control unit 10 may report an electric quantity of the shared bicycle to the cloud server 30 when the bicycle lock is unlocked. The cloud server 30 may send multimedia information to the main control unit 10 of the bicycle lock when the shared bicycle is at a high level of electric quantity, or may refrain from sending the multimedia information to the main control unit 10 of the bicycle lock when the shared bicycle is at a low level of electric quantity to prevent insufficient storage space of the shared bicycle that affects users' usage of the shared bicycle. The main control unit 10 of the bicycle lock may turn on and control at least one display screen of the plurality of display screens 21 to display the multimedia information after receiving the multimedia information. The main control unit 10 of the bicycle lock may not turn on the at least one display screen 21 when the shared bicycle is at the low level of electric quantity to prevent the shared bicycle running out electricity and affecting users' usage of the shared bicycle.

In some embodiments, when the shared bicycle is at the low level of electric quantity, the main control unit 10 of the bicycle lock may report the electric quantity to the cloud server 30, and the cloud server 30 may notify a staff to go to a location of the shared bicycle and charge the shared bicycle.

Figure 2:
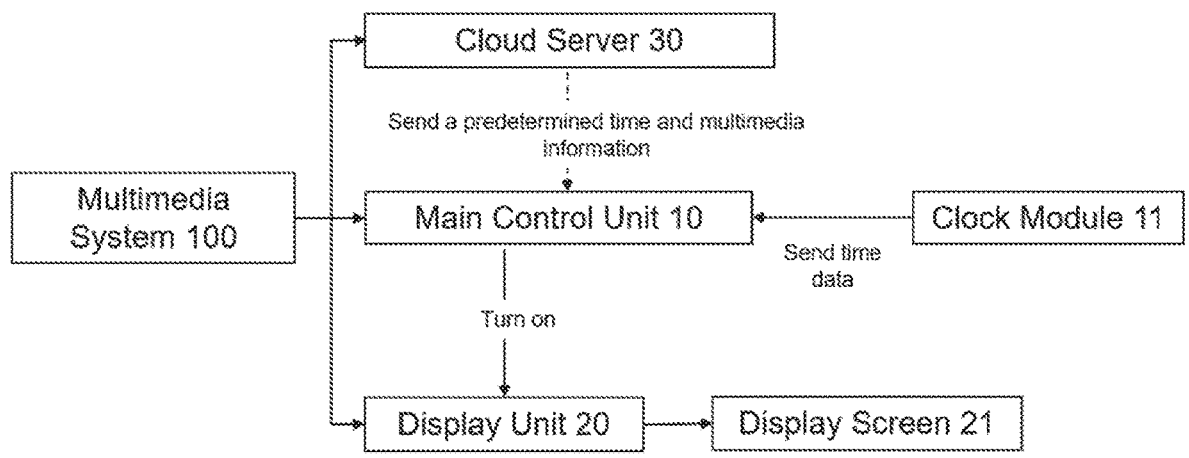
FIG. 2 is a block diagram illustrating an exemplary multimedia system of the present disclosure.

As shown in FIG. 2, the present disclosure provides another exemplary embodiment of the multimedia system 100.

The multimedia system 100 for a shared bicycle may include the main control unit 10 of the bicycle lock, the display unit 20, and the cloud server 30. The display unit 20 may include a plurality of display screens 21.

In some embodiments, the cloud server 30 may send a predetermined time and multimedia information to the main control unit 10 of the bicycle lock, the main control unit 10 may turn on and control at least one display screen of the plurality of display screens 21 to play the multimedia information at the predetermined time. In some embodiments, the main control unit 10 may further include a clock module 11. The clock module 11 may send time data to the main control unit 10 of the bicycle lock.

For example, the cloud server 30 may send a predetermined time of a time period from 9:00 am to 6:00 pm and multimedia information to the main control unit 10 of the bicycle lock of the shared bicycle located in a certain area, and the main control unit 10 of the bicycle lock may turn on and control all of the plurality of display screens 21 on the shared bicycle to display the multimedia information from 9:00 am to 6:00 pm.

Figure 3:
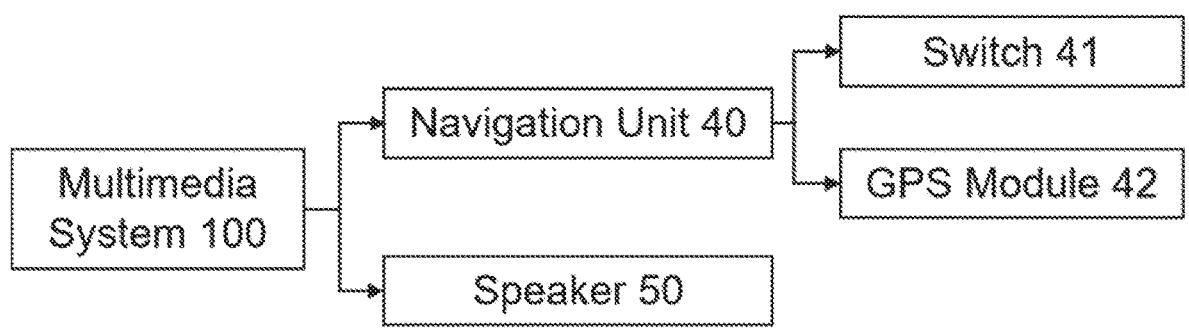
FIG. 3 is a block diagram illustrating an exemplary multimedia system of the present disclosure.

As shown in FIG. 3, the present disclosure provides another exemplary embodiment of the multimedia system 100.

In some embodiments, the multimedia system 100 may further include a navigation unit 40. The navigation unit 40 may include a switch 41 and a GPS module 42. The switch 41 and the GPS module 42 may be both disposed on the display unit 20. The GPS module 42 may generate a navigation route according to GPS signals when a display screen 21 and the switch 41 are both turned on. The display screen 21 may display the navigation route. In some embodiments, a touch screen may be disposed at the front of the display screen 21 to realize human-machine interactions. For example, when a user unlocks a shared bicycle, the display screen 21 may be turned on as described in the above embodiments, and then the user may turn on the switch 41 and the GPS module 42. The user may input a starting point and a destination on the display screen 21, the GPS module 42 may provide GPS signals to navigate, and the display screen 21 may display the navigation route. The user may go to the destination according to the navigation route displayed on the display screen 21.

In some embodiments, the GPS module 42 may include an antenna for transmitting and receiving GPS signals and a GPS signal processing chip. The GPS signal processing chip may obtain GPS signals through the antenna for navigation of the shared bicycle and may upload position information through the antenna for precise navigation.

Furthermore, the multimedia system 100 may further include a speaker 50 connected to the GPS module 42. The GPS module 42 may send a navigation route to the speaker 50, the speaker 50 may play a voice to perform direction guide according to the navigation route. The user may not need to pay attention to the navigation route displayed on the display screen 21 at all times, and the user may obtain the direction of the navigation route according to the voice.

In some embodiments, the user may perform operations such as navigation, searching a place, and searching a location of a surrounding public facility when riding the shared bicycle through a navigation unit 40 disposed on the shared bicycle. The user experience may be improved and dangerous behaviors during riding like watching a mobile phone for navigation may be avoided.

Figure 4:
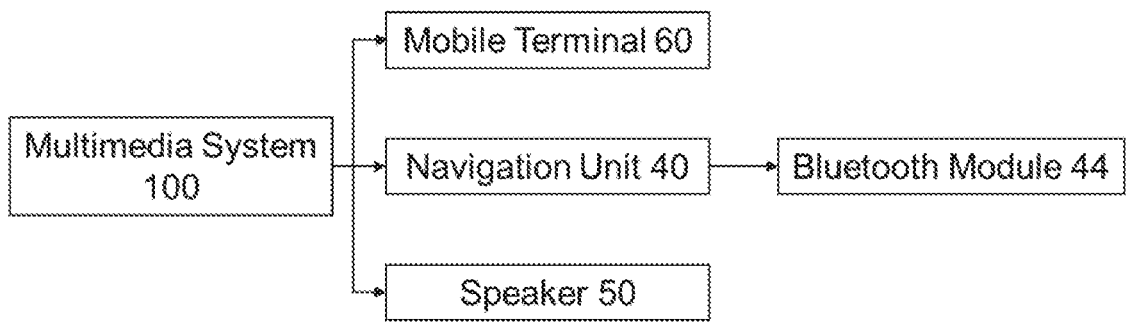
FIG. 4 is a block diagram illustrating an exemplary multimedia system of the present disclosure.

As shown in FIG. 4, the present disclosure provides another exemplary embodiment of the multimedia system 100.

In some embodiments, the multimedia system 100 may further include a mobile terminal 60. The navigation unit 40 may further include a Bluetooth module 44. The mobile terminal 60 may be wirelessly connected to the Bluetooth module 44, and the Bluetooth module 44 may send a navigation route to the mobile terminal 60. The user may obtain a route direction of the navigation route according to the voice prompted by the mobile terminal 60 after the mobile terminal 60 obtains the navigation route. In some embodiments, the user may obtain the route direction by inserting a headset into the mobile terminal 60, which is beneficial for the user to obtain the route direction through the voice when the user is in a noisy environments like streets.

In some embodiments, the mobile terminal 60 may be a mobile phone, a tablet computer or any other electronic device.

Figure 5:
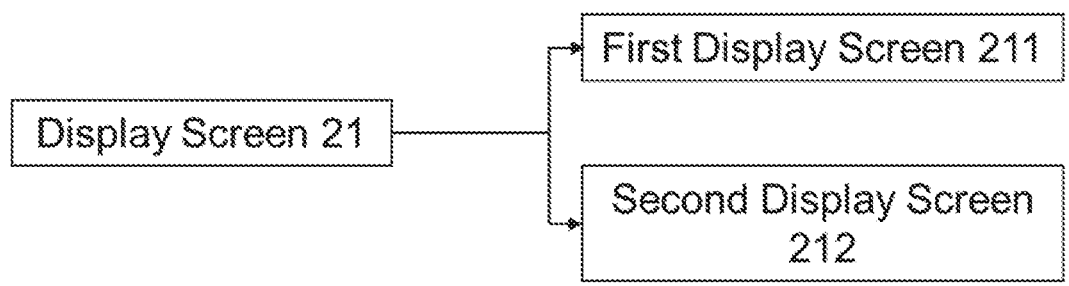
FIG. 5 is a block diagram illustrating an exemplary display screen of the present disclosure.

As shown in FIG. 5, the present disclosure provides an exemplary embodiment of a display screen 21.

In some embodiments, the display screen 21 may include a first display screen 211. The first display screen 211 may be set at the front of the shared bicycle, so that a user may observe information on the display screen 21 at first glance during riding the shared bicycle. The display screen 21 may be connected to a power supply of the shared bicycle, and the power supply may be charged by a solar charging device of the shared bicycle, or may be charged by a power flower-drum; at the same time, the display screen 21 may communicate with the main control unit 10 in a wired or wireless communication manner. The wireless communication manner may include a Bluetooth communication, a WIFI communication, a radio frequency communication, a mobile communication, etc. If the wired communication is adopted, an internal wiring of a frame of the shared bicycle may be designed to improve an overall beauty of the shared bicycle.

In some embodiments, the display screen 21 may further include a second display screen 212. The second display screen 212 may be disposed above a rear tire of the shared bicycle. For example, the second display screen may be disposed at a prominent position, such as a seat or a wheel bracket of the shared bicycle.

Referring to FIG. 3, the first display screen 211 may be configured to display the multimedia information or the navigation route, and the second display screen 212 may be configured to display the multimedia information. When the user turns on the switch 41 as described in the above embodiments, the first display screen 211 may display a navigation route; when the user turns off the switch 41, the first display screen 211 may display the multimedia information.

In some embodiments, the multimedia information may include a picture, a video, a text, a sound, or the like, or any combination thereof. In some embodiments, the picture and the video may be displayed in an embedded manner, such as a pop-up manner, a fade-in manner, etc. The picture may include a picture gallery. The text may include related text content displayed in a display area of the display screen 21, or a related inserted text when displaying other multimedia information. The sound may be played according to the corresponding multimedia information, or may be a piece of voice news played separately.

Figure 6:
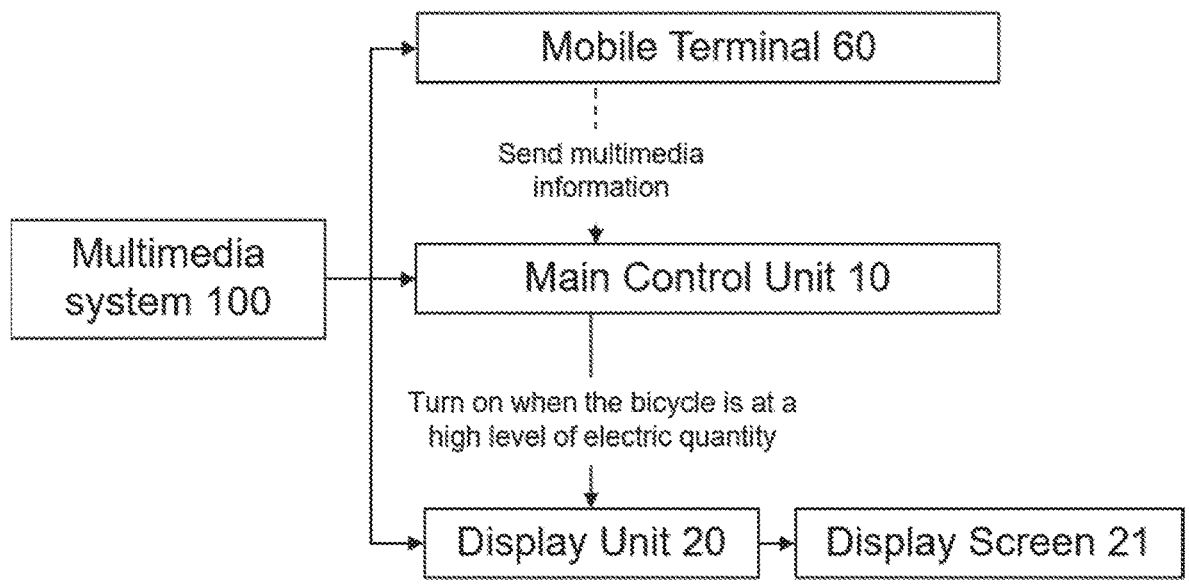
FIG. 6 is a block diagram illustrating an exemplary multimedia system of the present disclosure.

As shown in FIG. 6, the present disclosure provides another exemplary embodiment of the multimedia system 100.

The multimedia system 100 for a shared bicycle may include the main control unit 10 of the bicycle lock, the display unit 20, and the mobile terminal 60. The display unit 20 may include a plurality of display screens 21, the main control unit 10 may turn on at least one display screen 21 when the shared bicycle is at a high level of electric quantity. The mobile terminal 60 may send the multimedia information to the main control unit 10, and the main control unit 10 may control the display screen 21 to display the multimedia information.

For example, a staff may go to a location of the shared bicycle to activate the shared bicycle, at the same time, the main control unit 10 may turn on one or more of the display screens 21 when the shared bicycle is at a high level of electric quantity. The staff may charge the shared bicycle when the shared bicycle is at a low level of electric quantity, and the main control unit 10 may turn on all the display screens 21 when the shared bicycle is charged to high level of electric quantity. The staff may send the multimedia information to the main control unit 10 through the mobile terminal 60, and the main control unit 10 may control the display screen 21 to display the multimedia information.

In some embodiments, the mobile terminal 60 may be a mobile phone, a tablet computer, or any other electronic device.

In some embodiments, the main control unit 10 of the bicycle lock may be a main control circuit board embedded into the bicycle lock of the shared bicycle. The main control circuit board may be equipped with a navigation circuit for navigation. The navigation circuit may be the navigation unit 40, or may connect to the main control circuit board for data interaction through an independent navigation circuit board. The Bluetooth module 44 may be a sub-circuit embedded in the main control circuit board or may connect to the main control circuit board for data interaction through an independent Bluetooth circuit board, or may connect to the navigation circuit board for data interaction through a separate Bluetooth circuit board.

In summary, the embodiments described above are only embodiments of the present disclosure, and are not intended to limit the scope of protection of the present disclosure. Any modification, equivalent replacement, improvement, etc. made within the spirit and principle of this application shall be included in the protection scope of this application.

What is claimed is:

1. A multimedia system for a shared bicycle, comprising: a main control unit of a bicycle lock, a display unit, and a cloud server, wherein the display unit includes at least one display screen;

the main control unit of the bicycle lock is configured to send an electric quantity of the shared bicycle to the cloud server when the bicycle lock is unlocked;

in response that the shared bicycle is at a high level of electric quantity, the cloud server is configured to send multimedia information to the main control unit of the bicycle lock; and the main control unit of the bicycle lock is further configured to turn on the at least one display screen to display the multimedia information; and in response that the shared bicycle is at a low level of electric quantity, the main control unit is further configured to refrain from turning on the at least one display screen.

2. The multimedia system of claim 1, further comprising a navigation unit, wherein
the navigation unit includes a switch and a GPS module disposed on the display unit;
the GPS module is configured to generate a navigation route according to GPS signals when both the at least one display screen and the switch are turned on, and send the navigation route to the at least one display screen; and
the at least one display screen is configured to display the navigation route.

3. The multimedia system of claim 2, further comprising a mobile terminal, wherein
the navigation unit further includes a Bluetooth module;
the mobile terminal is wirelessly connected to the Bluetooth module; and
the Bluetooth module is configured to send the navigation route to the mobile terminal.

4. The multimedia system of claim 2, further comprising a speaker, wherein
the speaker is connected to the GPS module;
the GPS module is further configured to send the navigation route to the speaker; and
the speaker is configured to play a voice according to the navigation route.

5. The multimedia system of claim 2, wherein the at least one display screen includes a first display screen, and the first display screen is disposed at the front of the shared bicycle.

6. The multimedia system of claim 5, wherein the at least one display screen includes a second display screen, and the second display screen is disposed above a rear tire of the shared bicycle.

7. The multimedia system of claim 6, wherein the first display screen is configured to display the multimedia information or the navigation route, and the second display screen is configured to display the multimedia information.

8. The multimedia system of claim 1, wherein a form of the multimedia information includes at least one of a picture, a video, a text, or a piece of voice.

9. A multimedia system of a shared bicycle, comprising: a main control unit of a bicycle lock, a display unit, and a mobile terminal, wherein
the display unit includes at least one display screen;
the mobile terminal is configured to send multimedia information to the main control unit of the bicycle lock;
the main control unit of the bicycle lock is configured to turn on the at least one display screen when the shared bicycle is at a high level of electric quantity, and control the at least one display screen to display the multimedia information; and
the main control unit of the bicycle lock is configured to refrain from turning on the at least one display screen when the shared bicycle is at a low level of electric quantity.

10. The multimedia system of claim 9, further comprising a navigation unit, wherein
the navigation unit includes a switch and a GPS module disposed on the display unit;
the GPS module is configured to generate a navigation route according to GPS signals when both the at least one display screen and the switch are turned on, and send the navigation route to the at least one display screen; and
the at least one display screen is configured to display the navigation route.

11. The multimedia system of claim 10, wherein
the navigation unit further includes a Bluetooth module;
the mobile terminal is wirelessly connected to the Bluetooth module; and
the Bluetooth module is configured to send the navigation route to the mobile terminal.

12. The multimedia system of claim 10, further comprising a speaker, wherein
the speaker is connected to the GPS module;
the GPS module is further configured to send the navigation route to the speaker; and
the speaker is configured to play a voice according to the navigation route.

* * * * *